Jan. 7, 1958 — L. P. SPONTELLI — 2,818,745
SCREW CLEANING DEVICE
Filed Feb. 11, 1955

INVENTOR.
LEONARD P. SPONTELLI
BY
ATTORNEY

United States Patent Office 2,818,745
Patented Jan. 7, 1958

2,818,745

SCREW CLEANING DEVICE

Leonard P. Spontelli, Cleveland, Ohio, assignor to The Cleveland Pneumatic Tool Company, Cleveland, Ohio, a corporation of Ohio Application February 11, 1955, Serial No. 487,544

12 Claims. (Cl. 74—459)

This invention relates generally to a screw cleaning device for scraping and wiping foreign matter from the threads of a screw and is particularly adapted for use in conjunction with a ball screw device wherein dirt and other foreign matter is particularly troublesome.

It is an important object of this invention to provide a device for cleaning the surface of a screw or the like.

It is another important object of this invention to provide a cleaning mechanism wherein a plurality of scraping portions resiliently engage the surface of a screw and wherein means are provided to safely store substantial amounts of foreign matter after it has been removed from the screw.

It is still another object of this invention to provide a cleaning device for use in conjunction with a ball screw nut which prevents the passage of foreign matter on the screw into the nut thereby insuring frictionless ball operation.

It is still another object of this invention to provide a cleaning device for use in conjunction with a screw and nut wherein a multiplicity of spaced scraping means are provided which sequentially engage the surface of the screw and prevent foreign matter from passing into the nut.

Further objects and advantages will appear from the following description and drawings, wherein.

Figure 1:
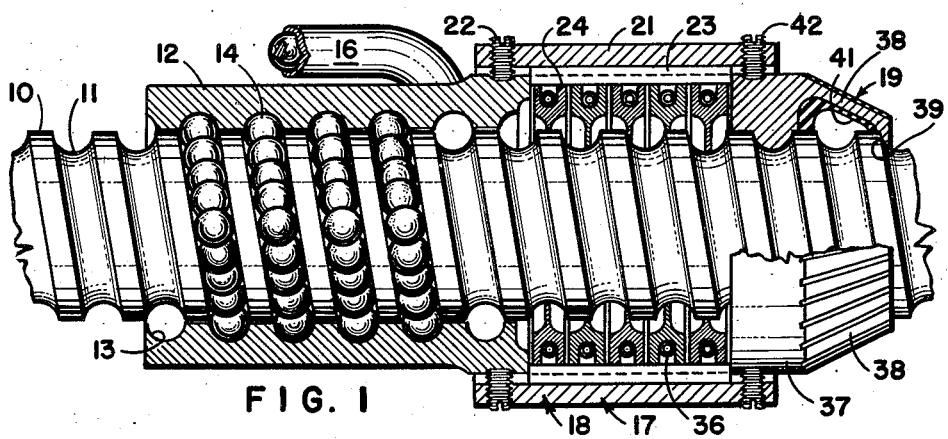
Figure 1 is a side elevation partially in longitudinal section showing a cleaning device according to this invention as it would be used in conjunction with a ball screw device.

In Figure 1 the preferred cleaning device is illustrated as it would be used in conjunction with a ball screw mechanism which provides a screw 10 formed with helical grooves 11 which cooperate with a nut 12 formed with internal helical grooves 13. The grooves 11 and 13 cooperate in the usual manner to define a helical ball channel filled with balls 14 which interconnect the nut and screw in such a manner that relative rotation therebetween produces relative axial motion. A return tube 16 is mounted on the nut 12 to convey the balls from one end of the nut to the other thereby completing a closed system of balls.

A cleaning device 17 according to this invention is shown mounted on one end of the nut 12 in such a manner that it extends axially along the portion of the screw 10 adjacent to the end of the nut. In most installations similar cleaning devices would be mounted on both ends of the nut to prevent dirt from passing into the nut from either direction; but for purposes of simplification only one cleaning device is shown in Figure 1.

The cleaning device 17 comprises two assemblies 18 and 19, the first of which is located directly adjacent to the end of the nut and the second of which is mounted on the outer end of the first. The first assembly 18 includes a cylindrical housing member 21 arranged to receive the end of the nut 12 and provided with two or more set screws 22 which securely attach the housing member to the end of the nut. Extending longitudinally along the housing 21 are keys 23 which prevent relative rotation between each cleaning segment 24 and the housing 21. In order to clearly understand the structural form of the cleaning segments 24, the steps of manufacture will be described.

Figure 2:
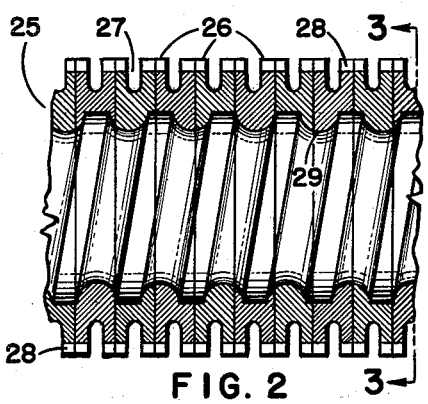
Figures 2 through 5 illustrate the progressive steps used in the preferred method of manufacturing the segments of the cleaning device according ot this invention.
Figure 3:
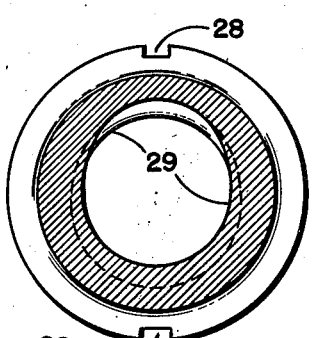
Figure 4:
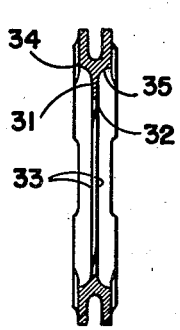
Figure 5:
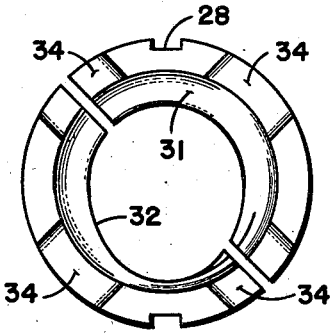
Figure 6:
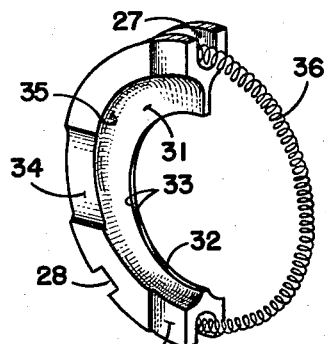
Figure 6 is a perspective view of one of the cleaning segments showing its cooperation with the preferred spring means utilized to resiliently urge the segment into engagement with the surface of the screw; and, Figure 7 is an exploded view of the cleaning segments illustrating the angular alignment utilized in the preferred structure.
Figure 7:
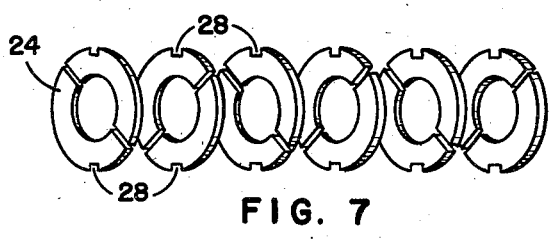

In the manufacture of the cleaning segments, a plurality of similar washers 26 previously formed with a peripheral annular groove 27 and axially extending keyways 28 are securely clamped together to form a cylinder 25 as shown in Figure 2. This cylinder 25 is arranged so that the axial keyways 28 of each washer are aligned and the individual washers are numbered so that proper sequence can be re-established after the washers are separated. The internal surfaces of the cylinder 25 are machined to provide a helically ridged inner surface 29 adapted to closely fit the surface of the screw 10. The individual washers 26 are then separated and the side portions adjacent to the internal surfaces are machined away leaving a radially extending fin 31 terminated at its inner end in an annular wiping surface 32 and providing relatively sharp scraping edges 33 on either side thereof. Thus a recessed portion 35 adjacent to the fin 31 provides a space immediately adjacent to the scraping surface for the foreign matter removed from the screw. A plurality of radially extending recesses 34 are also machined into the end faces of the individual washers 26 to provide additional room to receive foreign matter. Since the annular wiping surfaces 32 are portions of the inner surface 29 which was formed to closely fit the screw 11, the wiping surfaces 32 will closely fit the proper or corresponding annular portions of the screw surface. Each of the washers 26 is then cut in half to form two semi-circular matching cleaning segments which cooperate to form a wiping unit. The cuts on alternate washers are displaced 90° from the intermediate washers so that all the cleaning segments 24 will be displaced 90° from each of the axially adjacent cleaning members. The units of cleaning segments 24 are then assembled on the screw in the same sequence as they were positioned in the cylinder 25 and a spring 36 is positioned in the grooves 27 to resiliently urge each of the cleaning segments 24 against the surface of the screw 10. All of the units are then threaded along the screw to bring them together at which time the keyways 28 will be aligned and the keys 23 placed therein. The housing 21 is then slipped axially over the keys 23 and the assembly 18 is positioned adjacent to the nut 12 by rotating it relative to the screw 10, after which the set screws 22 are tightened.

The assembly 19 is formed with a body portion 37 and a plurality of circumferentially spaced axially extending fingers 38. The ends of the fingers 38 are provided with a wiping surface 39 proportioned to engage the surface of the screw 10. The fingers 38 are deflected outwardly by the surface of the screw 10 so that each surface 39 is resiliently urged into engagement with the screw surface. A plastic material 41 is molded onto the fingers to close the openings therebetween and assist in the wiping of the screw. This plastic 41 would be formed entirely around the finger but it has been eliminated from the lower portion of the assembly 19 in Figure 1 so the structure of the fingers 38 will be clearly shown. This plastic material 41 is preferably nylon or other similar tough material which will provide a relatively long service life. Set screws 42 securely attach the wiper assembly 19 to the housing 21. Reference should be made to the copending application, Serial No. 460,956, filed October 7, 1954, which issued as Patent No. 2,757,548 on August 7, 1956 in which I am a joint inventor with Ira D. Smith. The claims and specification of that copending application are directed to the wiper assembly 19 per se and a more detailed description of its structure and methods of manufacture may be found therein.

When the screw 10 is threaded axially relative to the nut 11, the surface of the screw passes first through the wiper assembly 19 then through the wiper assembly 18 and on into the nut itself. The surface of the screw as it is threaded toward the nut therefore, first comes into contact with the wiping surfaces 39 of the wiper assembly 19 which removes the majority of the foreign matter. This dirt removed by the wiper assembly 19 falls free of the screw. Any foreign matter that manages to penetrate past the wiper assembly 19 is engaged by the annular wiper surfaces 32 of the cleaning segments 24. Since a plurality of axially spaced annular wiper surfaces engage the surface of the screw, dirt is progressively removed and any dirt penetrating beyond one of the cleaning segments 24 is engaged by the next cleaning segment. It has been found in actual practice that efficient wiping is achieved even when the foreign matter is wet mud. Generally speaking, the larger particles of foreign matter are removed by the wiper assembly 19 and only fine particles of foreign matter manage to penetrate into the zone of the wiper assembly 18. As these particles are removed from the screw they are received in the recessed portions 35 adjacent to each of the fins 31.

After the wipers have operated through a number of cycles, the recessed portions 35 tend to become filled with dirt or foreign matter and in order to clean them it is merely necessary to open up the cleaning device. This is accomplished by first loosening the set screw 42 and then threading the wiper assembly 19 axially away from the nut along the screw. The set screws 22 are then loosened and the housing 21 is moved axially along the screw to expose the cleaning segments 24. The keys 23 can then be removed and the units are separated by threading them individually along the screw. At this time compressed air or other means may be utilized to remove the foreign matter which has accumulated in the recessed portions 35. The cleaning device may then be reassembled by reversing this procedure.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. A device for cleaning the surface of a helically grooved screw comprising a plurality of wiping members formed with wiping surfaces shaped to conform to portions of the screw surface, said members being positioned to form a series of separate axially spaced wiping areas adapted to engage axially spaced portions of the screw and clean the surface thereof upon relative movement therebetween, and means for resiliently urging said wiping surfaces toward the screw, the zones between said axially spaced areas being adapted to receive foreign matter removed from the screw.

2. A device for cleaning the surface of a helically grooved screw comprising a plurality of individual wiping members formed with wiping surfaces shaped to conform to portions of the screw surface, said members being positioned to form a series of axially spaced substantially continuous wiping areas adapted to engage axially spaced portions of the screw and clean the surface thereof upon relative movement therebetween, and means for resiliently urging said wiping surfaces toward the screw, the individual zones between said axially spaced areas being adapted to receive foreign matter removed from the screw.

3. A device for cleaning the surface of a helically grooved screw comprising a housing, a plurality of wiping members rotationally fixed in said housing formed with wiping surfaces shaped to conform to portions of the screw surface, said members being positioned to form a substantially continuous wiping area adapted to engage a portion of the screw and clean the surface thereof upon relative rotation therebetween, and means extending around said members for resiliently urging each wiping surface toward the screw.

4. In combination a helically grooved screw, a plurality of cleaning elements provided with separate axially spaced wiping surfaces engaging a plurality of axially spaced annular portions of said screw to clean the surface thereof upon relative motion therebetween, and resilient means urging said wiping surfaces into engagement with said screw, and separate zones between said wiping surfaces adapted to receive foreign matter removed from said screw.

5. In combination a helically grooved screw, a plurality of cleaning elements provided with separate wiping surfaces engaging a plurality of axially spaced annular portions of said screw, and resilient means urging said wiping surfaces into engagement with said screw to clean the surface thereof upon relative motion therebetween, said cleaning elements being formed with isolated recesses adjacent to said wiping surfaces adapted to receive foreign matter removed from said screw.

6. In combination a helically grooved screw, a plurality of axially spaced cleaning units each including a plurality of cleaning members cooperating to form an annular ring around said screw, each of said members being formed with a wiping surface engaging a portion of said screw adapted to clean the surface thereof upon relative motion therebetween, a resilient member for each unit resiliently urging each of said wiping surfaces into engagement with said screw, a cylindrical housing extending over said units, and means between each member and housing preventing relative rotation therebetween.

7. In combination a helically grooved screw, a plurality of axially spaced cleaning units each including a plurality of cleaning members cooperating to form an annular ring around said screw, each of said members being formed with a wiping surface engaging a portion of said screw adapted to clean the surface thereof upon relative motion therebetween and a peripheral groove, an annular resilient member in the groove of each unit resiliently urging each of said wiping surfaces into engagement with said screw, a cylindrical housing extending over said units, and means between each member and housing preventing relative rotation therebetween.

8. In combination a helically grooved screw, a plurality of axially spaced cleaning units each including a plurality of cleaning members cooperating to form an annular ring around said screw, each of said members being formed with an inwardly projecting fin of reduced axial extent terminating in a wiping surface engaging a portion of said screw adapted to clean the surface thereof upon relative motion therebetween, means resiliently urging each of said wiping surfaces into engagement with said screw, a cylindrical housing extending over said units, and means between each member and housing preventing relative rotation therebetween.

9. In combination a helically grooved screw, a plurality of axially spaced cleaning units each including a plurality of cleaning members cooperating to form an annular ring around said screw, each of said members being formed with an inwardly projecting fin of reduced axial extent terminating in a wiping surface engaging a portion of said screw adapted to clean the surface thereof upon relative motion therebetween and a peripheral groove, an annular resilient member in the groove of each unit resiliently urging each of said wiping surfaces into engagement with said screw, a cylindrical housing extending over said units, and means between each member and housing preventing relative rotation therebetween.

10. In combination a helically grooved screw, and a cleaning device including first and second cleaning assemblies; said first assembly providing a plurality of cleaning elements formed with first wiping surfaces engaging a plurality of axially spaced portions of said screw and resilient means urging said wiping surfaces into engagement with said screw, said second assembly including a body formed with a plurality of axially extending fingers providing second wiping surfaces engaging said screw, and resilient means for pressing each of said second wiping surfaces against said screw, said wiping surface progressively cleaning the surface of said screw upon relative movement therebetween.

11. In combination a helically grooved screw, a nut on said screw formed with complimentary helical grooves, and a cleaning device on said nut including first and second cleaning assemblies; said first assembly providing a plurality of cleaning elements formed with first wiping surfaces engaging a plurality of axially spaced portions of said screw and resilient means urging said wiping surfaces into engagement with said screw, said cleaning elements being formed with recesses adjacent to said first wiping surfaces adapted to receive foreign matter removed from said screw; said second assembly including a body formed with a plurality of axially extending fingers providing second wiping surfaces engaging said screw, and resilient means for pressing each of said second wiping surfaces against said screw, said wiping surfaces progressively cleaning the surface of said screw upon relative movement therebetween.

12. In combination a helically grooved screw, a nut on said screw formed with complimentary helical grooves, and a cleaning device on said nut including first and second cleaning assemblies; said first assembly providing a plurality of axially spaced cleaning units each including a plurality of arcuate cleaning elements formed with an inwardly extending fin of reduced lateral extent terminating in a wiping surface resiliently engaging said screw, the axial spacing of said fins providing a zone adapted to receive foreign matter removed from said screw; said second assembly including a body formed with a plurality of axially extending fingers providing second wiping surfaces engaging said screw, and resilient means for pressing each of said second wiping surfaces against said screw, said wiping surfaces progressively cleaning the surface of said screw upon relative movement therebetween.

References Cited in the file of this patent

UNITED STATES PATENTS 2,567,483     Hotine  ---------------- Sept. 11, 1951